United States Patent
Park

(10) Patent No.: US 7,527,151 B2
(45) Date of Patent: May 5, 2009

(54) PACKAGING CASE FOR WIPER BLADES

(76) Inventor: Se-Heon Park, 406-203 Saetbyeol maeul, Bundang-dong 39, Bundang-gu, Seongnam-si, Gyeonggi-do (KR)

( * ) Notice: Subject to any disclaimer, the term of this patent is extended or adjusted under 35 U.S.C. 154(b) by 548 days.

(21) Appl. No.: 11/229,592

(22) Filed: Sep. 20, 2005

(65) Prior Publication Data
US 2006/0081493 A1    Apr. 20, 2006

(30) Foreign Application Priority Data
May 3, 2005    (KR)    ............ 10-2005-0037160

(51) Int. Cl.
*B65D 73/00*    (2006.01)
(52) U.S. Cl. .................. 206/470; 206/335; 206/461
(58) Field of Classification Search ............ 206/470, 206/461, 467, 471, 477, 806, 335; 220/4.23
See application file for complete search history.

(56) References Cited

U.S. PATENT DOCUMENTS

| | | | | |
|---|---|---|---|---|
| 4,666,037 A | * | 5/1987 | Weissman | 206/63.5 |
| 5,180,599 A | * | 1/1993 | Feldmeier et al. | 426/106 |
| 5,545,956 A | * | 8/1996 | Salvio et al. | 318/283 |
| 5,829,593 A | * | 11/1998 | Appleton | 206/454 |
| 5,899,334 A | * | 5/1999 | Domerchie et al. | 206/470 |
| 2003/0062284 A1 | * | 4/2003 | Charng | 206/470 |

* cited by examiner

*Primary Examiner*—J. Gregory Pickett
*Assistant Examiner*—Jenine M Pagan
(74) *Attorney, Agent, or Firm*—Lowe Hauptman Ham & Berner, LLP

(57) ABSTRACT

A packaging case for wiper blades includes a lower case (20), a locating plate (30), and an upper case (40). The lower case (20) has a wiper storage compartment (21) opened upward and recessed downward. The locating plate (30) is attached via a hinge (31) on an edge of the lower case (20) to reside in an upper portion of the storage compartment (21), and has two rows of pluralities of locating tabs (32, 33), between which a space for inserting a wiper blade (5) is allocated. The upper case (40) is attached via a hinge (41) on another edge of the lower case (20), and has a plurality of locking protrusions (43) on the periphery at the upper portion of the storage compartment (42) for coupling to the lower case (20). The lower case (20), locating plate (30), and upper plate (40) are formed in one piece.

6 Claims, 4 Drawing Sheets

[FIG. 1]
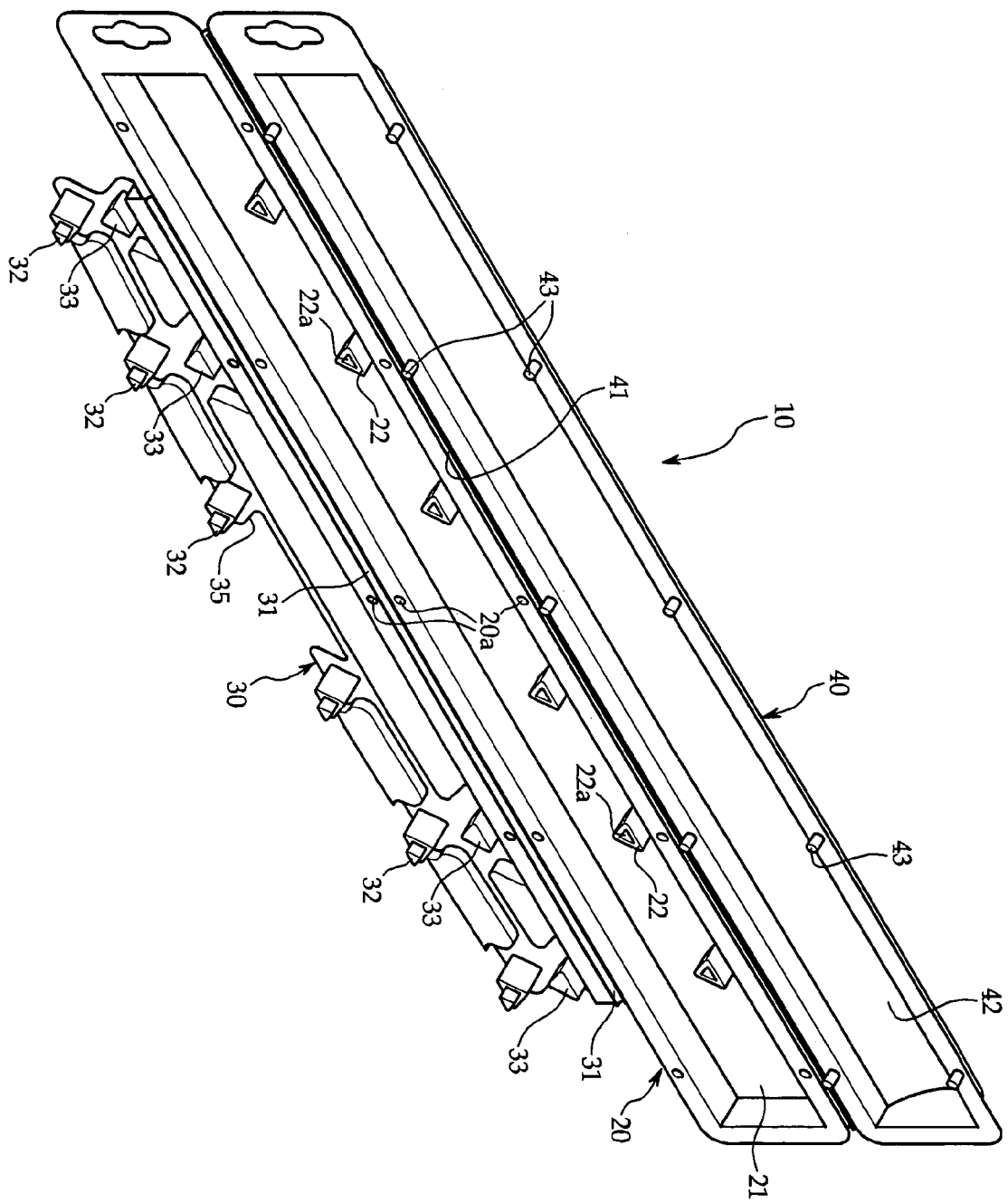

[FIG. 2]
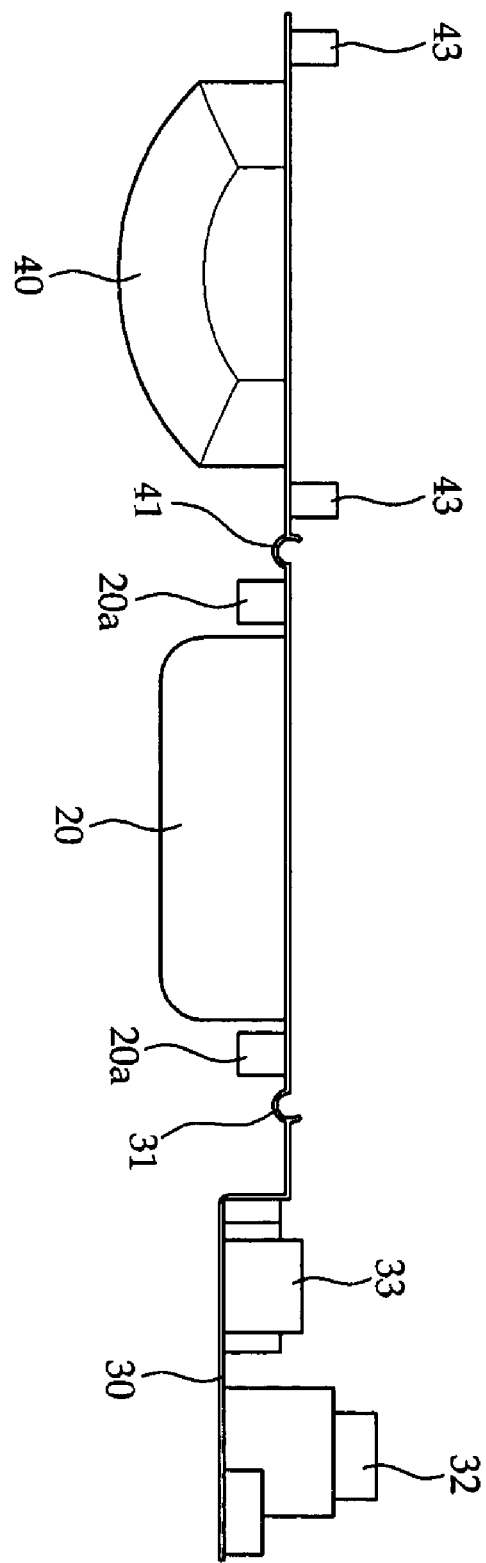

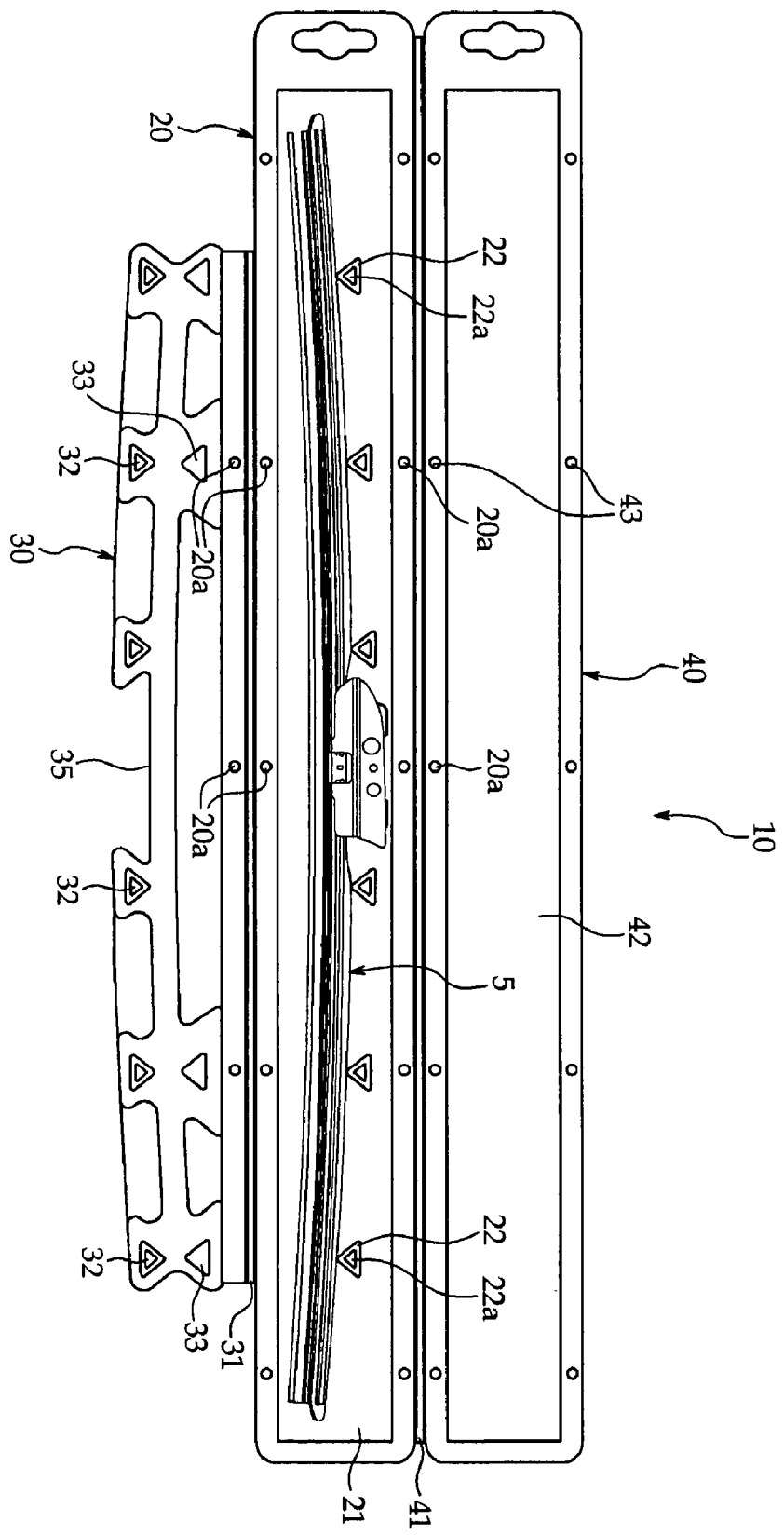
[FIG. 3]

[FIG. 4]
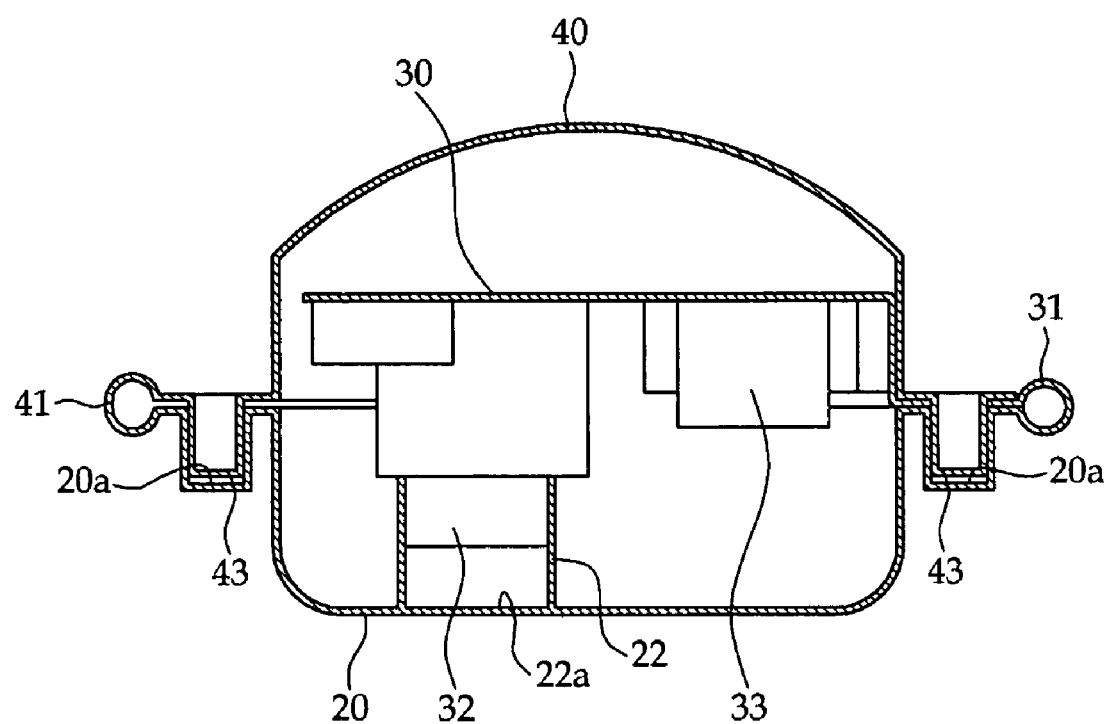

PACKAGING CASE FOR WIPER BLADES

BACKGROUND OF THE INVENTION

1. Field of the Invention

The present invention relates to a packaging case for automotive wiper blades, and more particularly, to a packaging case for automotive wiper blades that prevents deformation of wiper blades during storage, while reducing packaging volume and space required for transport and display, and is, at the same time, inexpensive to manufacture.

2. Description of the Related Art

Automotive wiper blades are instruments for clearing droplets of rain, dust, or other foreign objects from the front (and rear) windshield of a vehicle. As parts that require replacement due to wear after a certain duration of use, wiper blades are packaged in cases to transport, display, and vend them.

Because vehicular windshields have curved surfaces, automotive wiper blades are curved as well. Thus, wiper blade packaging cases of the prior art are formed in curved or straight designs according to the curvatures of the blades they are to hold. Because the widths of such cases are inappropriately broad in comparison to the lengths, the case takes up too much space when loaded for transport or arranged for display. Accordingly, the quantity of wiper blades that can be transported in a given container is reduced so that the cost of shipping increases, and a wider display area is required.

To overcome this problem, a two-part packaging case has been proposed in the related art. This case consists of a case that straightens a wiper blade and a case that packages the straightening case.

Because the two cases must be manufactured separately, which requires additional manufacturing processes and materials, the manufacturing cost increases.

SUMMARY OF THE INVENTION

The present invention is designed to solve the problems of the prior art, and therefore an object of the invention is to provide a wiper blade packaging case capable of reducing manufacturing cost by being manufactured in a single case and packaging a wiper blade without distorting its shape.

In order to accomplish the above objects of reducing manufacturing cost by forming a case in one piece and preventing deformation of wiper blades, the present invention provides an automotive wiper blade packaging case including: a lower case having a wiper storage compartment opened upward and concaving downward; a locating plate connected along the length of one edge of the lower case by a film hinge, to be disposed in the upper portion of the storage compartment, and having two linearly arranged rows of pluralities of locating tabs with a space therebetween for inserting a wiper blade; and an upper case connected along the length of another edge of the lower case by a film hinge, and having a storage compartment opened upward and a plurality of locking protrusions around a perimeter thereof for coupling with the lower case, wherein the lower case, the locating plate, and the upper case are formed in one piece of a transparent synthetic resin.

In addition, disposed on the bottom of the storage compartment of the lower case are fastening columns corresponding in number to the locating tabs on the lower case and having a respective fastening receptacle for coupling with each locating tab.

Furthermore, the locating plate has a locating enclosure for enclosing a central portion of the wiper blade disposed in the lower case.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a perspective view of a wiper blade packaging case according to the present invention;

FIG. 2 is a sectional view of FIG. 1;

FIG. 3 is an exemplary view showing a wiper blade placed in a wiper blade packaging case according to the present invention; and FIG. 4 is a sectional view showing an assemble wiper blade packaging case according to the present invention.

DETAILED DESCRIPTION OF THE INVENTION

Hereinafter, a preferred embodiment of the present invention will be described in detail with reference to the accompanying drawings.

FIG. 1 is a perspective view of a wiper blade packaging case according to the present invention, FIG. 2 is a sectional view of FIG. 1, FIG. 3 is an exemplary view showing a wiper blade placed in a wiper blade packaging case according to the present invention, and FIG. 4 is a sectional view showing an assembled wiper blade packaging case according to the present invention.

Referring to FIGS. 1 and 2, the wiper case 10 is formed in one piece of a transparent synthetic resin.

The automotive wiper case 10 includes a lower case 20, a locating plate 30 connected along the length of one edge of the lower case 20 by a film hinge 31, and an upper case 40 connected along the length of the other edge of the lower case 20 by a film hinge 41.

Here, the locating plate 30 for enclosing and perpendicularly straightening a wiper blade 5, is shorter in length than the upper and lower cases 30 and 40, and has a width approximately equal to the storage compartment 21 of the lower case 20.

The locating plate 30 has two relatively straight rows of pluralities of locating tabs 32 and 33 with a space therebetween for locating the wiper blade 5, and folds into the lower case 20 by means of an intermediate film hinge 31 so that it is disposed in the upper portion of the storage compartment 21.

On the floor of the storage compartment 21 of the lower case 20 are fastening columns 22 corresponding in number to the locating tabs 32 and having a respective fastening receptacle 22a to couple with each locating tab 32. The locating tabs 32 are formed to snap fasten to the fastening receptacles 22a on the fastening columns 22.

In addition, the locating plate 30 has a locating enclosure 35 to enclose the central portion of the wiper blade 5 located inside the lower case 20. The locating enclosure 35 functions to centrally position the wiper blade inside the packaging case.

The upper case 40 is connected to the opposite edge of the lower case 20 by a film hinge 41, and has a plurality of locking protrusions 43 disposed around the upper perimeter of the storage compartment 42 for coupling into locking holes 20a on the lower case 20.

The wiper case 10, having the lower case 20, the locating plate 30, and the upper case 40, is formed in one piece. As shown in FIG. 4, the locating plate 30 folds into the storage compartment 21 of the lower case 20 by means of an intermediary film hinge 31, to be disposed thereabove. Next, the upper case 40 is folded by means of the film hinge 41 to couple with the lower case 20 above the locating plate 30.

The wiper case 10 assembled in the above order packages a wiper blade 5 so that it is substantially straight in a perpendicular direction.

First, the wiper blade 5 is inserted between the locating tabs 32 and 33 of the locating plate 30. Because the locating tabs 32 and 33 are arranged in two straight rows, the wiper blade 5 is forcefully positioned in a straight manner.

In this state, if the locating plate 30 is pivoted on the film hinge 31, the wiper blade 5 is positioned above the storage compartment 21 of the lower case 20, and the locating tabs 32 are simultaneously snap fitted in the fastening receptacles 22a of the fastening columns 22, as shown in FIG. 3.

Accordingly, the locating plate 30 holds the wiper blade 5 above the storage compartment 21.

Further, by pivoting the upper case 40 on the film hinge 41 to close it, the locking protrusions 43 on the upper case 40 snap fasten into the locking holes 20a on the locating plate 30 and the lower case 20.

Consequently, the wiper blade 5 is straightened by the locating plate 30 and centrally packaged inside the upper and lower cases 40 and 20.

The wiper blade case 10, having the three components (being the lower case 20, locating plate 30, and the upper case 40) formed in one piece, is manufactured in a single step, reducing the number of molds and material required. This and the simple assembly process collaborate to significantly reduce manufacturing costs.

Also, the wiper blade 5 is confined to a straight position by the locating plate 30 so that the overall width of the case is reduced, enabling a larger quantity of packaged wiper blades to be shipped or displayed in a given area.

As described above, the automotive wiper blade packaging case of the present invention packages wiper blades in a straight profile by means of a single case, thereby reducing the width of the packaging case. Not only is the overall packaging volume reduced, but a significant reduction of manufacturing processes and cost is also achieved by forming the packaging case in a single piece. The result is an increase in the number of units that can be stored in a given space, and a reduction in the area required to display a given number of units.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A wiper blade packaging case comprising:
a lower case including a wiper storage compartment defining a first cavity therein;
a locating plate foldably connected to a first edge of the lower case by a hinge, a locking plate configured to be disposed in an upper portion of the wiper storage compartment, and having at least two linearly arranged rows of a plurality of locating tabs, said rows defining a space therebetween for receiving a wiper blade; and
an upper case foldably connected to a second edge opposite to the first edge of the lower case by a hinge, said upper case defining a second cavity corresponding to the first cavity and having a plurality of first locking elements around an upper perimeter thereof for engaging with a respective second locking element provided on the lower case, wherein
the lower case, the locating plate, and the upper case are formed in one piece;
a first row of the two linear rows of the locating tabs is located near the first edge of the lower case and the a second row is located opposite to the first row;
the wiper storage compartment of the lower case includes a plurality of fastening columns corresponding to each of the locating tabs in the first row, said fastening columns are disposed on the bottom surface thereof and each of the fastening columns includes a plurality of second locking feature engagaeble with the respective first locking feature; and
the upper portion of the wiper storage compartment is spaced away from a bottom surface delimiting the first cavity.

2. The packaging case of claim 1, wherein the locating plate includes a locating enclosure for enclosing a central portion of the wiper blade disposed in the lower case.

3. The packaging case of claim 1, wherein the lower case, the locating plate, and the upper case are formed of a transparent synthetic resin enabling viewing therethrough.

4. The packaging case according to claim 1, wherein each of the locating tabs in the first row defines a first locking feature thereon.

5. The wiper blade packaging case of claim 1, wherein a length of the locating plate is shorter than a length of the first edge of the lower case.

6. The wiper blade package of claim 1, wherein each of the fastening columns has a triangular cross section.

* * * * *